(12) United States Patent
Radziwon

(10) Patent No.: US 11,299,650 B2
(45) Date of Patent: Apr. 12, 2022

(54) SILICONE BASED SELF-ADHERING ARTICLE AND A METHOD FOR MAKING SAME

(71) Applicant: Leigh Ann Radziwon, Colchester, CT (US)

(72) Inventor: Leigh Ann Radziwon, Colchester, CT (US)

( * ) Notice: Subject to any disclaimer, the term of this patent is extended or adjusted under 35 U.S.C. 154(b) by 143 days.

(21) Appl. No.: 16/793,686

(22) Filed: Feb. 18, 2020

(65) Prior Publication Data

US 2020/0325357 A1 Oct. 15, 2020

Related U.S. Application Data

(62) Division of application No. 15/136,213, filed on Apr. 22, 2016, now abandoned.

(60) Provisional application No. 62/152,563, filed on Apr. 24, 2015.

(51) Int. Cl.
| | |
|---|---|
| C09D 183/04 | (2006.01) |
| C09J 183/04 | (2006.01) |
| B32B 7/06 | (2019.01) |
| B29C 39/12 | (2006.01) |
| B29C 39/00 | (2006.01) |
| B32B 25/20 | (2006.01) |
| B32B 25/04 | (2006.01) |
| B32B 1/00 | (2006.01) |
| B32B 5/32 | (2006.01) |
| B29C 39/10 | (2006.01) |

(Continued)

(52) U.S. Cl.
CPC ............ *C09D 183/04* (2013.01); *B29C 39/00* (2013.01); *B29C 39/10* (2013.01); *B29C 39/12* (2013.01); *B32B 1/00* (2013.01); *B32B 5/32* (2013.01); *B32B 7/06* (2013.01); *B32B 25/045* (2013.01); *B32B 25/20* (2013.01); *C09J 7/25* (2018.01); *C09J 183/04* (2013.01); *B29K 2083/005* (2013.01); *B32B 2264/00* (2013.01); *B32B 2264/12* (2013.01); *B32B 2266/0207* (2013.01); *B32B 2307/4026* (2013.01); *B32B 2307/414* (2013.01); *B32B 2307/422* (2013.01); *B32B 2307/58* (2013.01); *B32B 2307/732* (2013.01); *B32B 2307/748* (2013.01); *B32B 2405/00* (2013.01); *B32B 2535/00* (2013.01); *C09J 2301/162* (2020.08); *C09J 2400/243* (2013.01); *C09J 2483/00* (2013.01); *C09J 2483/006* (2013.01)

(58) Field of Classification Search
None
See application file for complete search history.

(56) References Cited

U.S. PATENT DOCUMENTS

| | | |
|---|---|---|
| 2,387,512 A | 10/1945 | Hilberg et al. |
| 2,882,183 A | 4/1959 | Bond et al. |
| 3,775,226 A | 11/1973 | Windorf |

(Continued)

FOREIGN PATENT DOCUMENTS

CA 2361684 A1 4/2003

*Primary Examiner* — Chinessa T. Golden
(74) *Attorney, Agent, or Firm* — Cantor Colburn LLP

(57) ABSTRACT

An article includes a non-tacky cured silicone first layer, an optional foamed material and a tacky cured silicone second layer wherein the first layer is directly bound to the second layer and the article is conformable to a body part. The article removably adheres to a body part. Also described is a method of making the article.

16 Claims, 5 Drawing Sheets

(51) Int. Cl.
*C09J 7/25* (2018.01)
*B29K 83/00* (2006.01)

(56) References Cited

U.S. PATENT DOCUMENTS

| | | | |
|---|---|---|---|
| 4,838,253 A * | 6/1989 | Brassington | A61L 15/26 |
| | | | 602/48 |
| 4,991,574 A * | 2/1991 | Pocknell | A61L 15/26 |
| | | | 128/DIG. 21 |
| 5,101,756 A | 4/1992 | Strumbos | |
| 5,279,058 A | 1/1994 | Kohn | |
| 5,829,507 A | 11/1998 | Pawlowsji | |
| 5,922,470 A | 7/1999 | Bracken et al. | |
| 6,248,414 B1 | 6/2001 | Donahue | |
| 6,660,352 B2 | 12/2003 | Hsu et al. | |
| 6,878,414 B2 | 4/2005 | Meccia et al. | |
| 6,958,179 B2 | 10/2005 | Carlson et al. | |
| 7,175,898 B2 | 2/2007 | Luhmann et al. | |
| 8,268,426 B2 | 9/2012 | Antonini | |
| 8,334,037 B2 | 12/2012 | Sheridan et al. | |
| 8,501,294 B1 | 8/2013 | Wheatley et al. | |
| 8,662,949 B2 | 3/2014 | McKinney | |
| 2002/0090509 A1 | 7/2002 | Hsu et al. | |
| 2003/0008095 A1 | 1/2003 | Meccia | |
| 2003/0134138 A1 | 7/2003 | Kreckel et al. | |
| 2003/0222247 A1 | 12/2003 | Putman et al. | |
| 2007/0065618 A1 | 3/2007 | Fischer et al. | |
| 2008/0114276 A1 * | 5/2008 | Janusson | A61F 13/069 |
| | | | 602/46 |
| 2011/0220295 A1 | 9/2011 | Krawinkel et al. | |
| 2013/0029078 A1 | 1/2013 | Gaddis et al. | |
| 2016/0198790 A1 | 7/2016 | Ishmael et al. | |
| 2016/0312077 A1 | 10/2016 | Radziwon | |

* cited by examiner

SILICONE BASED SELF-ADHERING ARTICLE AND A METHOD FOR MAKING SAME

CROSS REFERENCE TO RELATED APPLICATIONS

This application claims priority to U.S. patent application Ser. No. 15/136,213 filed on Apr. 22, 2016 which claims the benefit of U.S. Provisional Application No. 62/152,563 filed on Apr. 24, 2015, both of which are incorporated by reference herein in their entirety.

FIELD OF THE INVENTION

This invention relates generally to a formable article having a durable non-tacky front surface and more particularly to a formable article having a non-tacky front surface and an adhesive back surface.

BACKGROUND

Silicone based materials having a non-tacky front surface and a tacky back surface are known in the art and are typically used for many applications that involve lightweight articles such as wall hooks and the like. One such material type is described in U.S. application Ser. No. 12/377,555. However, current materials typically have a separate adhesive coating or layer that is applied to the one or more surfaces of the material which allows the material to adhere to a surface via pressure. Unfortunately, these types of materials either leave an unwanted residue that needs to be washed away and can damage a surface or the materials are not easily constructed, are only available on a limited basis and are not very modifiable.

BRIEF SUMMARY

Described herein is an article comprising a non-tacky cured silicone first layer and a tacky cured silicone second layer. The first layer is directly bound to the second layer. The article is conformable to a body part. The article also can removably adhere to a body part without the use of an additional substance.

Also described is an article comprising a non-tacky cured silicone first layer at least partially disposed on and directly bound to a foamed silicone material and a tacky cured silicone second layer at least partially disposed on and directly bound to the foamed silicone material. The article is conformable to a body part. The article can removably adhere to a body part without the use of an additional substance.

Also described is a method of making the aforementioned articles. The method comprises applying a first uncured silicone to a mold; optionally disposing a foamed silicone material on at least a portion of the first uncured silicone; curing the first uncured silicone to form a cured non-tacky silicone first layer; disposing a second uncured silicone on the optional foamed silicone material and any exposed area of the first layer; and curing the second uncured silicone to form a tacky cured silicone second layer.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

Figure 1:
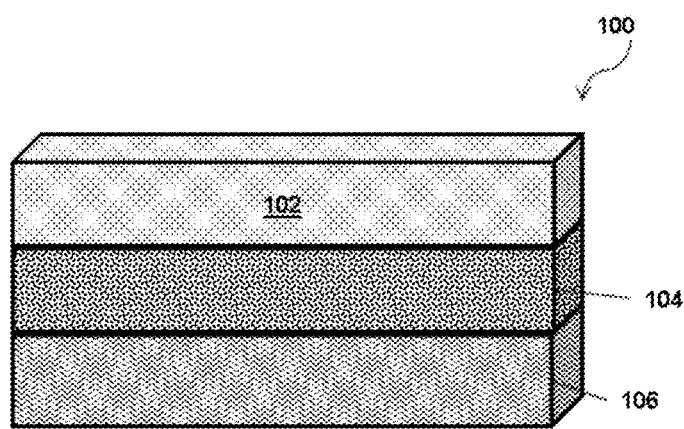
FIG. 1 is a front side isometric view of a silicone article, in accordance with an exemplary embodiment.

Disclosed herein is an article that has a tacky backing to allow the article to removably adhere to a body part without leaving a residue that needs to be cleaned. Additionally, the article can be reused multiple times (i.e. multiple re-adhesions) and can withstand heat, rain, wind, cold and complete water submersion without un-adhering from the body part. The silicone article may be configured as desired. Moreover, the article is customizable and may be colored and/or may include "glow-in-the-dark" properties along with embedded designs and items (such as logos, beads, etc.). The silicone article may be written on with permanent marker or pen which is then removable with rubbing alcohol. Furthermore, makeup and other paints may be applied and easily removed.

It will be understood that when an element is referred to as being "on" or "adjacent to" another element, it can be directly on or adjacent to the other element or intervening elements may be present there between. In contrast, when an element is referred to as being "directly on" or "directly adjacent to" another element, there are no intervening elements present. Similarly, when an element is referred to as being "directly bound" to another element there is no intervening material or adhesive. Without being bound by theory it is believed that one layer is directly bound to another layer the layers are chemically bound through curing.

It will be understood that, although the terms "first," "second," "third," etc. may be used herein to describe various elements, components, regions, layers and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2:
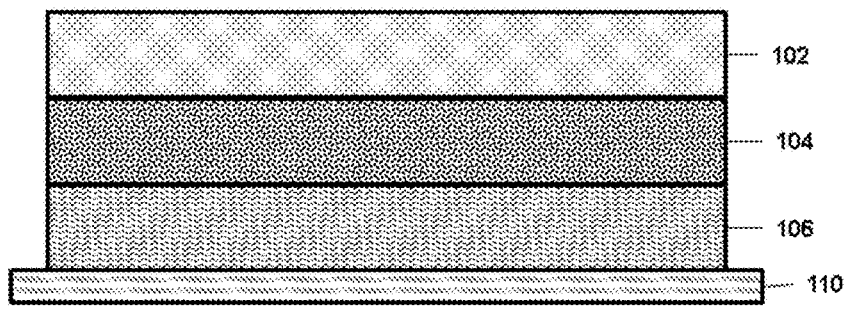
FIG. 2 is a side sectional view of the silicone article of FIG. 1.
Figure 3:
FIG. 3 is a side sectional exploded view of the silicone article of FIG. 1.

Referring to the FIG. 1, FIG. 2 and FIG. 3, a side sectional view of the silicone article 100 is shown and includes a first layer 102, an optional foam material 104, and a second layer 106, wherein the first layer 102 is at least partially disposed on the foam material 104. The second layer 106 is at least partially disposed on the foam material when present and disposed on the exposed first layer 102.

The first layer 102 comprises a non-tacky silicone material which has a non-tacky outer surface. The term "non-tacky" as used herein describes a surface, which exhibits no stickiness when touched by a human hand using a reasonable amount of force at room temperature. The first layer 102 includes a first layer outer surface 108 and may comprise pigment, dye, luminescent particles, fluorescent particles, or a combination thereof as desired, to allow the silicone material 100 to have decorative properties, such as glow-in-the-dark properties and/or a desired colored tint. Additionally, it is contemplated that the first layer 102 comprises any type of non-tacky silicone rubber suitable to the desired end purpose, such as, but not limited to, platinum cured silicone, tin cured silicone, RTV silicone and/or silicone gum. Such materials are commercially available. Suitable materials include Dragon Skin available from Smooth On, VST-50F available from Factor II, and p-125 available from Silicone Inc. The first layer 102 can have a thickness of 0.2 to 15 millimeters, or, 0.5 to 12 millimeters, or, 1 to 10 millimeters (mm). The thickness of the first layer may vary over the entirety of the article depending on the final form. It should be appreciated that the first layer 102 may be of any thickness as desired suitable to the desired end purpose.

The optional foam material 104 may be present in portions of the article or form a layer disposed between the first layer and the second layer as shown in the figures. The optional foam layer advantageously reduces the weight of the article while providing height and volume in locations where a more pronounced three dimensional effect is desired. For example, the foam material can be used to help form a prominent brow or nose as part of a facial mask.

The optional foam material comprises a silicone foam which is formed from a silicone polymer and a foaming agent. The foaming agent may be formed in situ by a chemical reaction or become activated by contact with air. In some cases the foaming agent can function as both a foaming agent and an initiator for curing. The foam material can be cured or uncured. Exemplary foam materials are commercially available as Soma Foma® 25 from Smooth On or Platinum Silicone Foam from Factor II. The optional foam material may further comprise pigment, dye, luminescent particles, fluorescent particles, or a combination thereof as desired. The optional foam material may have a thickness of 0.1 to 30 mm, or, 0.2 to 20 mm, or, 0.5 to 12 mm and the thickness may vary across the material.

The second layer 106 comprises a tacky silicone, having high tack properties such that the outer surface is tacky (sticky) to the touch. "Tacky", as used herein, refers to a material which is sticky to the touch and can adhere up to 1 gram of weight per square centimeter of tacky silicone to a vertical section of human skin for greater than or equal to 15 minutes. It should be appreciated that the second layer 106 leaves little and/or no film on a body part to which it adheres and then is removed.

It should be appreciated that the tacky silicone material used for the second layer 106 preferably comprises a hypoallergenic, skin safe material and provides for a permanent and/or reusable adhesion. For example, it is contemplated that the second layer 106 is constructed from any type of tacky silicone material suitable to the desired end purpose, such as, but not limited to, platinum cured silicone, tin cured silicone, RTV silicone and/or silicone gum. These materials are commercially available. Suitable materials include High Tack Silicone Gel A-4717 available from Factor II. Additionally, other commercial silicone materials such as Dragon Skin® available from Smooth-On can be modified by adding a silicone fluid such as Slacker® Tactile Mutilator available from Smooth-On and Si-Thinner available from Silicones Inc. The silicone fluid may be a low viscosity (<100 centistokes) non-reactive silicone fluid. The amount of the silicone fluid combined with the commercial silicone material will depend somewhat upon the molecular weight and characteristics of the commercial silicone material. A material which has a softer and more gel like feel will need less silicone fluid than a more rigid material to obtain the desired tackiness for adhesion to a body part. In an exemplary embodiment 15 weight percent of Dragon Skin® is mixed with 85 weight percent of Slacker® Tactile Mutilator, based on the combined weight of Dragon Skin® and Slacker® Tactile Mutilator, to form the tacky silicone material.

In at least one embodiment, the second layer 106 may have a thickness of 0.1 to 20 mm, or, 0.5 to 10 mm, or 1 to 2 mm. It is contemplated that in other embodiments the second layer 106 may vary in thickness and may be any thickness desired. It should be appreciated that the second layer 106 may be of any thickness as desired suitable to the desired end purpose.

It should be further appreciated that the tacky silicone material used in the second layer 106 may be a two part, clear to translucent, pourable silicone system that cures at room temperature to form a tacky material. Polymerization may occur without formation of heat. Polymerization may occur at room temperature without the application of heat. It is contemplated that the second layer 106 may be tin cured silicone, RTV silicone and/or silicone gum and, in some embodiments, heat may be used to accelerate the curing process. It should be appreciated that in another embodiment, the second layer 106 is not limited to a two part clear to translucent, pourable silicone system that cures at room temperature to form a tacky material and may be any tacky silicone material suitable to the desired end purpose. Thus, the system may have more or less than two parts.

For example, for some silicone materials, two parts are mixed together (A&B—where one is a catalyst and the other is the base), sometimes they are both liquids. Sometimes only one part is a liquid (for example, the catalyst) and the other is more like molasses consistency (for example, the base). And sometimes A&B are two solids that may be "rolled" or kneaded together to mix the catalyst and base together. If A&B are liquids, the tacky silicone material may be "poured" onto the non-tacky and spread onto the surface. If A&B are thicker, like molasses, the tacky silicone material may be painted or pressed onto the non-tacky material. And if A&B are solids, the tacky silicone material may be "rolled" onto the non-tacky. Thus, it should be appreciated that the present invention is not limited to any one particular embodiment.

Figure 4:
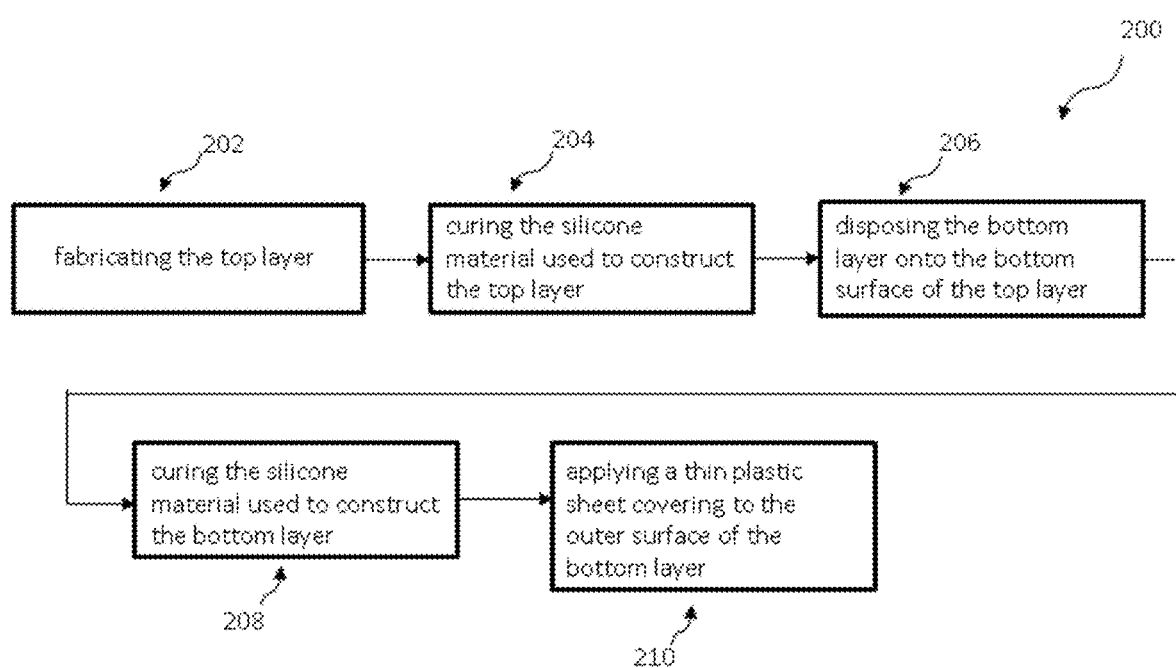
FIG. 4 is an operational block diagram illustrating a method for fabricating the silicone article of FIG. 1, in accordance with an exemplary embodiment.
Figure 5:
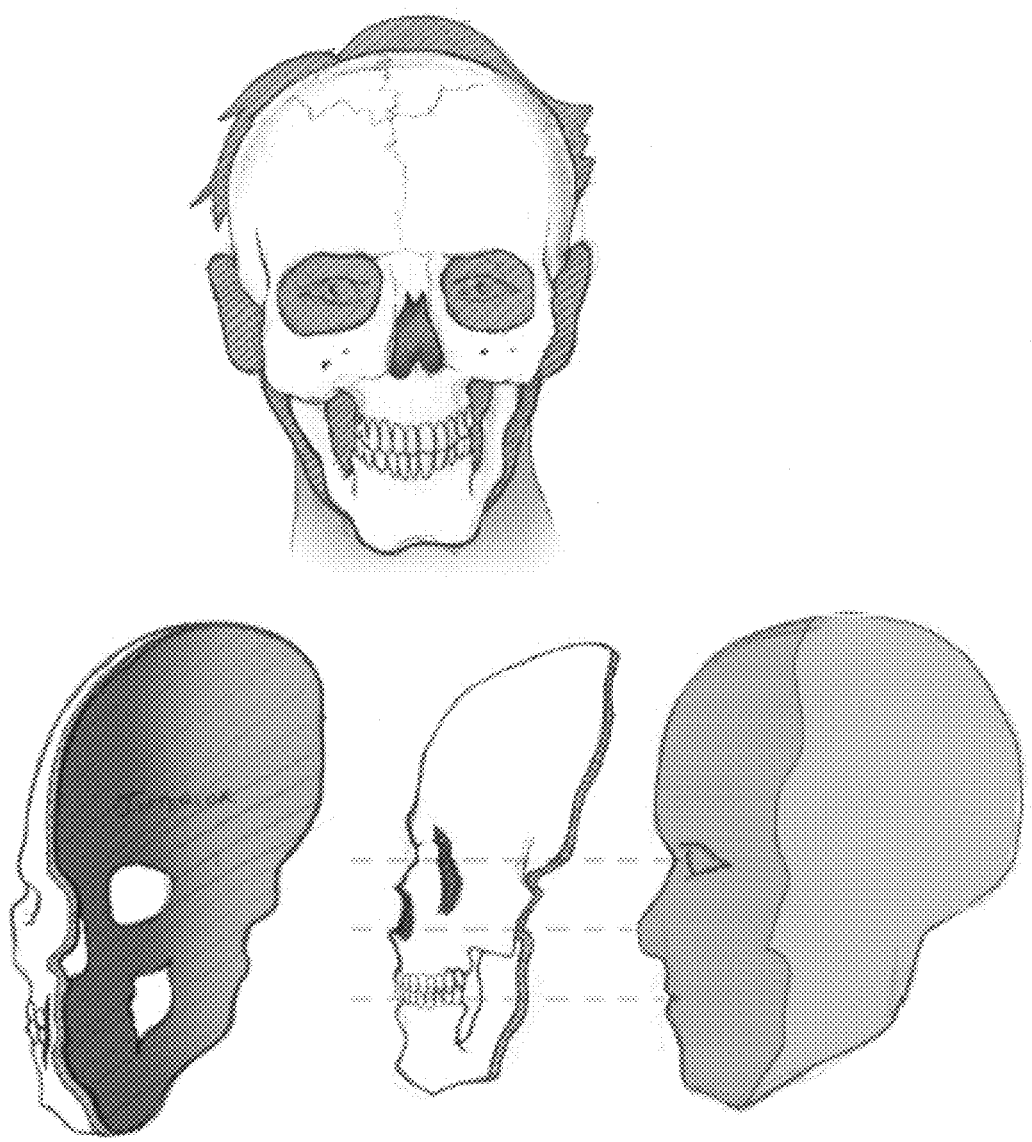
FIG. 5 illustrates various views of shapes that the silicone article can assume.
Figure 6:
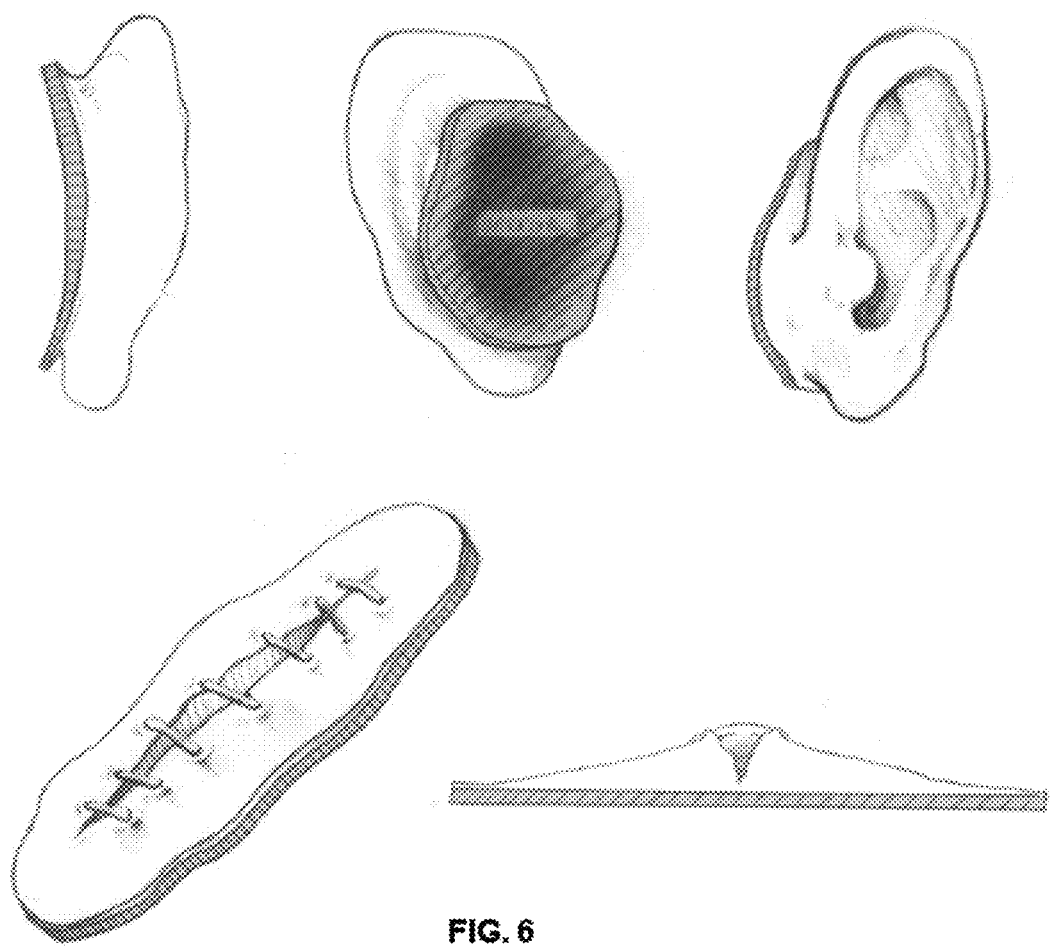
FIG. 6 illustrates various views of shapes that the silicone article can assume.

Referring to FIG. 4, an operational block diagram illustrating one embodiment of a method 200 for fabricating the silicone article 100 is provided and includes, fabricating the first layer 102, as shown in operational block 202. This is accomplished by forming a non-tacky translucent rubber silicone material into a sheet. This may be achieved by pouring, rolling, forming (for 3-dimensional shapes) and/or pressing the non-tacky translucent rubber silicone material onto a mold surface to a desired thickness and/or shape. It should be appreciated that the mold shape may be any shape desired and is not limited to a flat surface or 2-dimensional shape. For example, in one embodiment, the mold surface may be a face or skull as shown in FIG. 5. In another embodiment, the mold surface may be an ear or scar, as shown in FIG. 6. Essentially, the silicone article 100 is not limited to only one shape and may be molded, cut and/or shaped into any shape desired. This is advantageous in several fields for several reasons, such as special effects (entertainment industry) and/or prosthetics (medical industry). Accordingly, it should be appreciated that the silicone article 100 may be used multiple times.

If desired, the non-tacky translucent rubber silicone material may be altered in physical appearance by adding pigments, dyes, powders (such as color and/or glow powders), flocking, reflector beads, etc. The non-tacky translucent rubber silicone material is then allowed to cure at room temperature to form the first layer 102, as shown in operational block 204.

Once the first layer 102 is formed and decorated as desired, the foamed material and the second layer or just the second layer is disposed onto the non-tacky translucent rubber silicone material, as shown in operational block 206. The foamed material is typically placed in the desired location. The foamed material may be molded in the desired shape prior to placing it in the desired location. The application of the second layer may be accomplished by pouring, rolling and/or pressing the high tack silicone material onto the non-tacky translucent rubber silicone material and/or foam material. The tacky silicone material may comprise pigment, dye, luminescent particles, fluorescent particles, or a combination thereof as desired. The tacky silicone material is then allowed to cure at room temperature or with the application of heat to form the second layer 106, as shown in operational block 208. Once the second layer 106 is fully cured, a release layer 110 may be applied to the tacky outer surface of the second layer 106, as shown in operational block 210. This protects the tacky outer surface of the second layer 106 from sticking to itself or from picking up contaminants that would impede its ability to adhere to surfaces.

At this point, the silicone article 100 may be preformed, shaped and/or cut into desired shapes using a knife, razor, scissors, shape cutter, press, stamp or the silicone article 100 may rolled into a roll (such as 'tape') or other object for storage. It is contemplated that the non-tacky silicon material and/or the tacky silicone material may be actively (i.e. using an agent or a device/method) or passively cured (i.e. allowing the material to cure at room or other suitable temperature). Additionally, it is contemplated that the silicon article may be 3-dimensional and thus, may include shapes/contours in addition to "flat surfaces." For example, the non-tacky silicon material may be configured to look like an ear, a nose, a scar, a bullet wound, a skull, a three dimensional facial mask, etc.

While the invention has been described with reference to an exemplary embodiment, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

The invention claimed is:

1. An article comprising a non-tacky cured silicone first layer and a tacky cured silicone second layer wherein the first layer is directly bound to the second layer and the article is conformable to and removably adheres to a body part and further wherein the article is reusable, wherein the tacky cured silicone second layer adheres up to 1 gram of weight per square centimeter of tacky silicone to a vertical section of human skin for greater than or equal to 15 minutes.

2. The article of claim 1, wherein the first layer further comprises luminescent particles.

3. The article of claim 1, wherein the first layer has a thickness of 0.2 to 15 millimeters.

4. The article of claim 1, wherein the second layer has a thickness of 0.1 to 20 millimeters.

5. The article of claim 1, further comprising a foamed silicone material disposed between portions of the first and second layers.

6. The article of claim 5, wherein the foamed silicone material has a thickness of 0.1 to 30 millimeters.

7. The article of claim 1, wherein the first layer further comprises fluorescent particles.

8. The article of claim 1, wherein the first layer further comprises pigment.

9. The article of claim 1, wherein the first layer further comprises dye.

10. The article of claim 1, wherein the non-tacky cured silicone first layer has a physical appearance of a simulated scar.

11. The article of claim 1, wherein the non-tacky cured silicone first layer has a physical appearance of a simulated wound.

12. The article of claim 1, wherein the non-tacky cured silicone first layer has a physical appearance of an ear.

13. The article of claim 1, wherein the non-tacky cured silicone first layer has a physical appearance of a nose.

14. The article of claim 1, wherein the non-tacky cured silicone first layer has a physical appearance of a skull.

15. The article of claim 1, wherein the non-tacky cured silicone first layer has a physical appearance of a decorative facial mask.

16. The article of claim 15, wherein the decorative facial mask comprises a pronounced three dimensional effect.

\* \* \* \* \*